(12) United States Patent
Allmer et al.

(10) Patent No.: US 7,794,143 B2
(45) Date of Patent: Sep. 14, 2010

(54) DENTAL X-RAY PACKETS HAVING NON-LEAD RADIATION SHIELDING

(75) Inventors: Dennis W. Allmer, Yaphank, NY (US); Elliot R. Gemunder, Dix Hills, NY (US)

(73) Assignee: Air Techniques, Inc., Melville, NY (US)

( * ) Notice: Subject to any disclaimer, the term of this patent is extended or adjusted under 35 U.S.C. 154(b) by 66 days.

(21) Appl. No.: 12/215,822

(22) Filed: Jun. 30, 2008

(65) Prior Publication Data

US 2009/0010396 A1    Jan. 8, 2009

Related U.S. Application Data

(60) Provisional application No. 60/937,957, filed on Jul. 2, 2007.

(51) Int. Cl.
    *A61B 6/14* (2006.01)
(52) U.S. Cl. ..................................................... 378/169
(58) Field of Classification Search ......... 378/168–175, 378/181–190
    See application file for complete search history.

(56) References Cited

U.S. PATENT DOCUMENTS

| 2,286,748 | A  | * | 6/1942  | Martin ........................ 378/169 |
| 4,791,657 | A  | * | 12/1988 | Kirsch et al. ................. 378/169 |
| 6,312,828 | B1 | * | 11/2001 | Akao .......................... 428/516 |
| 6,579,007 | B1 | * | 6/2003  | Bacchetta et al. ............ 378/169 |
| 6,612,740 | B1 | * | 9/2003  | Resch et al. ................. 378/169 |
| 7,063,459 | B2 | * | 6/2006  | McGovern et al. .......... 378/169 |

* cited by examiner

Primary Examiner—Irakli Kiknadze
(74) Attorney, Agent, or Firm—Clifford G. Frayne

(57) ABSTRACT

This dental intra-oral film packet configuration includes a film chip and a non-lead radiation shielding member insertable in the light-tight envelope or integral to a wall of the light-tight envelope. The film chip has two sides sensitive to radiation exposure, and the packet protecting the film chip incorporates the radiation shielding fiber powder element on one side of the film chip to provide backscatter radiation equal to the lead (Pb) foil embodiment when the film packet is exposed to radiation. The radiation shielding embodiment is a compounded material of thermoplastic and non-lead metal which couples as the light-shielding member of the envelope or as an insertable shield.

8 Claims, 3 Drawing Sheets

DENTAL X-RAY PACKETS HAVING NON-LEAD RADIATION SHIELDING

RELATED APPLICATIONS

Applicant claims the benefit of provisional application Ser. No. 60/937,957, filed Jul. 2, 2007.

BACKGROUND OF THE INVENTION

1. Field of the Invention

The present invention relates to x-ray film packets, and in particular, to an intra-oral radiographic x-ray film packet which does not employ lead for scattered radiation shielding.

2. Description of the Prior Art

Intra-oral radiographic x-ray film packets, also generally referred to as intra-oral radiographic film packets, or dental x-ray packets, have been employed in dental offices to capture x-rays of a patient's teeth and gums. It is known in the art that heavy metals provide a shielding effect against various forms of radiation. Their effectiveness is associated with the size of their atomic nucleus, or as is commonly referred to in the art, their absorption cross section. An effective heavy metal used to provide the shielding function in current medical and dental radiography is lead (Pb). Lead has several advantages. The ease of which it is formed, combined with its high density and relatively low cost make it a prime material to use in x-ray applications. Lead also provides high quality radiographic images by minimizing the image effects of back scattered radiation.

In utilization of lead (Pb) foil material as the physical state of shielding, an impression in the foil material can be included to visually indicate the orientation of the intra-oral film packet as it was x-ray exposed. The result is a faint image in the processed film chip whereby it alerts the dental practitioner that the film has been oriented in reverse. In conjunction with the functional embodiment of the backscatter inhibiting film packet, lays an interim paper component wrapping the film chip for easy removal of the film chip from the outer envelope, as well as, a barrier against various foreign contamination to the image surface of the film chip, including but not limited to; moisture, oils, scratches, pressure marks.

Finally, the current art embodiment with lead (Pb) shielding includes a position indicating dot (dimple). This indicator is a useful orientation aid for the dental practitioner insomuch that it clearly identifies exposed side, shielded side, top and bottom of the film chip for diagnosis purposes. Although in principle it is not a requirement to have, because without it a trained individual can decipher the chemically processed image and know the orientation it went through at the exposure state. It is fundamentally non-essential for the current state of the art, but does offer a welcome aid to those performing the dental procedures.

The main problem with the current dental intra-oral x-ray film embodiment is the lead (Pb) foil material. Due to imposing regulatory directives regarding hazardous materials, known ramifications of routine contact, and tighter disposal restrictions, lead (Pb) material has become a difficult material to work with, and discard. Although the embodiment requires a backscatter inhibiting feature, lead foil needs to be supplanted for a non-hazardous shielding material of equivalent backscatter protection.

Concerns for environmental issues and environmental consciousness has lead to a perception that heavy metals pose environmental issues in their use, even, in x-ray film packets where the patient has no contact with the lead radiation shield. Still further, there is a desire to eliminate the lead shielding in the x-ray packets, which would normally be discarded after use, and again poses a perception of environmental concern.

U.S. Pat. No. 6,459,091 to DeMeo, relates to a radiation protective garment having barium sulfate coated fibers. U.S. Pat. No. 4,670,658 to Myers is directed to a flexible sheet coated with barium sulfate that is used to shield and protect medical personnel during procedures where radiation back scatter can be a problem. While these systems have achieved a certain degree of success from their particular application, these materials are not suitable for shielding radiation in a dental x-ray packet because of the required thickness needed to provide the equivalent absorption which would make the dental packet exceed the industries standards and norms.

U.S. Pat. No. 6,042,267 to Muraki discloses an intra-oral x-ray image pick up apparatus which uses copper tungsten as an x-ray shielding member, which again is not practical because of the necessary thickness required. Therefore there has been a need to provide a substitute shielding element for the lead commonly used in x-ray film packets which is usually present in the form of a lead strip or film juxtaposed the actual film chip within the packet envelope. Applicant has developed an x-ray film packet in which the shielding member, i.e. the substitute for the lead film, is incorporated directly into the envelope itself and obviates the need for a film insert within the envelope to act as a shielding member.

OBJECTS OF THE INVENTION

An object of the present invention is to provide a novel dental x-ray packet that does not employ lead for radiation shielding.

Another object of the present invention is to provide a novel dental x-ray packet which provides comfortable operation when used within the oral cavity of a patient.

A further object of the present invention is to provide a novel dental x-ray film packet which provides high quality radiographic images.

A still further object of the present invention is to provide a novel dental x-ray packet that employs material that is not perceived to have environmental issues.

Another object of the present invention is to provide for a novel dental x-ray film packet in which the shielding member may be incorporated directly into the outer envelope and obviates the need for a shielding insert within the envelope.

Another object of the present invention is to provide for a novel dental x-ray packet in which the shielding is accomplished through the use of a relatively inexpensive heavy metal.

SUMMARY OF THE INVENTION

This dental intra-oral film packet configuration includes a film chip and a non-lead radiation shielding member insertable in the light-tight envelope or integral to a wall of the light-tight envelope. The film chip has two sides sensitive to radiation exposure, and the packet protecting the film chip incorporates the radiation shielding fiber powder element on one side of the film chip to provide backscatter radiation equal to the lead (Pb) foil embodiment when the film packet is exposed to radiation. The radiation shielding embodiment is a compounded material of thermoplastic and non-lead metal which couples as the light-shielding member of the envelope or as an insertable shield.

BRIEF DESCRIPTION OF THE DRAWINGS

These and other objects of the present invention will become apparent from the following, and more particularly, description of the preferred embodiments of the invention as illustrated in the accompanying drawings wherein.

DETAILED DESCRIPTION OF THE INVENTION

Figure 1:
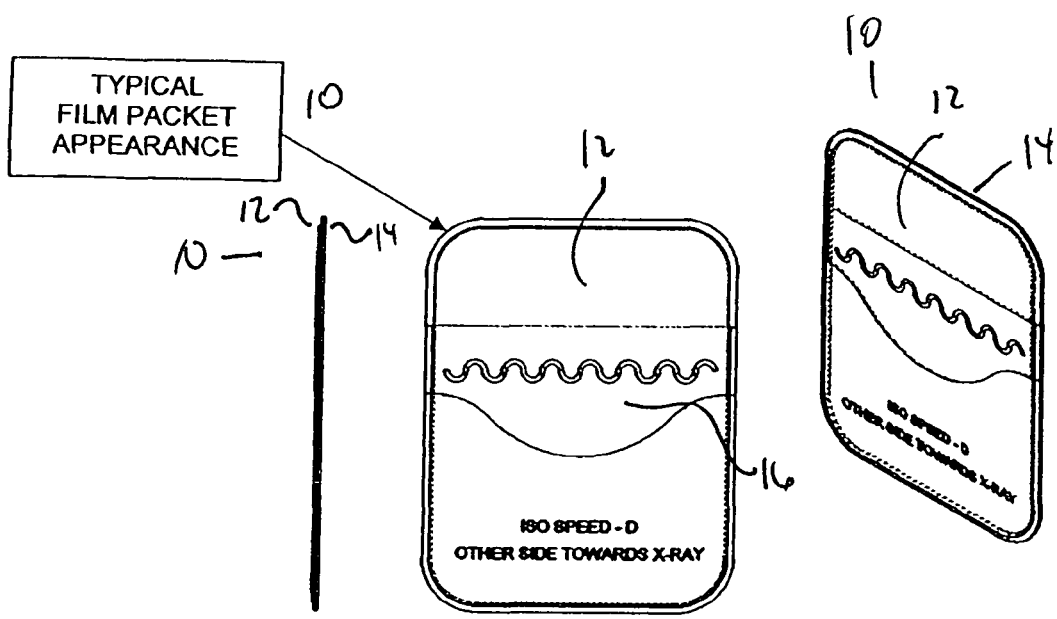
FIG. 1 illustrates a front and side view of a dental film packet in accordance with the present invention.

FIG. 1 is a front and side view of a dental intra-oral x-ray film packet 10 of the present invention. The dental intra-oral x-ray film packet has application to all sizes of dental films which are commonly referred to in the trade and identified as follows: ISO #0 (35 mm×22 mm), ISO #1 (40 mm×24 mm), ISO #2 (41 mm×31 mm), ISO #3 (54 mm×27 mm), and ISO #4 (76 mm×57 mm). The film packet 10 as identified in FIG. 1 defines an envelope formed of two layers of light opaque thermoplastic material 12 and 14 between which is sandwiched a film chip (not shown), together with a paper barrier component. Normally one of the thermoplastic film sheets is formed with a lift wall flap 16 which aids in the removal of the film chip once it has been exposed.

Figure 2:
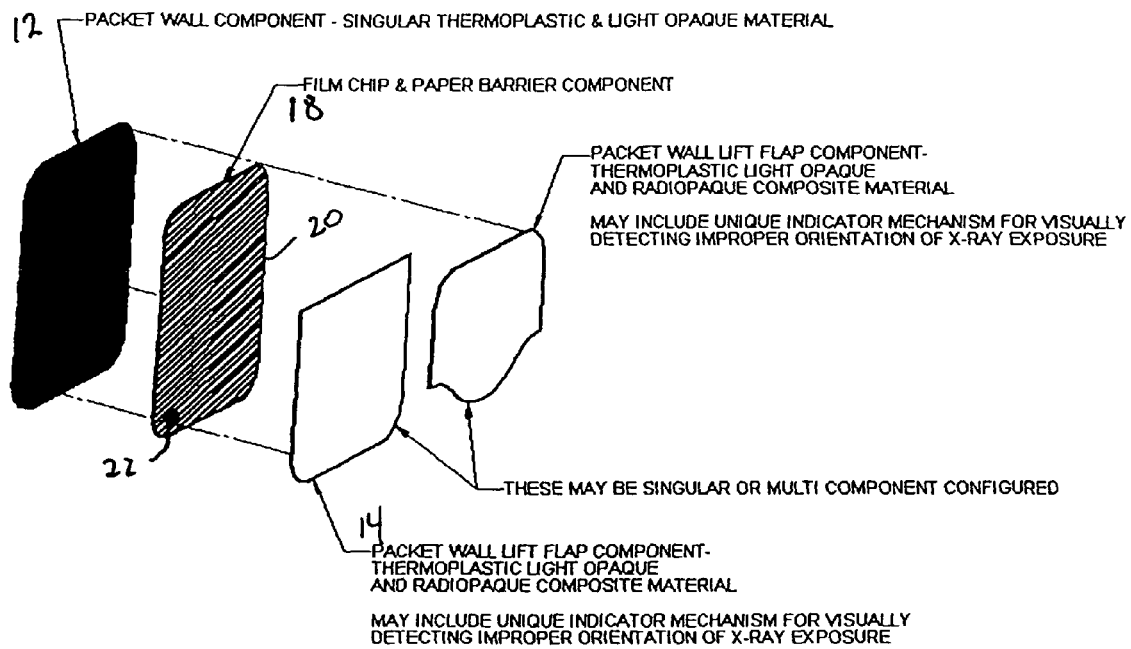
FIG. 2 illustrates a diagrammatic exploded view of the elements of the dental x-ray film packet of the present invention.

FIG. 2 is an exploded view of the dental intra-oral x-ray film packet 10 of the present invention. In this illustration, thermoplastic wall component 12 is formed of a light opaque material. The film chip 18, including a paper barrier component 20, is sandwiched between thermoplastic wall component 12 and thermoplastic wall component 14. Thermoplastic wall component 14 is composed of a thermoplastic light opaque material having a radiopaque composite material mixed therein the radiopaque composite material for radiation shielding. Wall component 14 may be formed as singular or as a multicomponent, including the wall lift flap 16 for ease of removal of the film chip 18.

The radiopaque material formed in the thermoplastic sheet 14 would be a non-lead metal fiber powder, preferably tungsten, or an alloy of stainless steel. This non-lead metal fiber powder, integral with one of the thermoplastic sheets comprising the envelope of the dental intra-oral x-ray packet, provides the radiation shielding. The non-lead metal fiber powder shielding compound exhibits a minimum of 65% radiation absorption at 65 kVp at an 8 inch distance of exposure, which implies a transmissive aspect of 35%.

Both of the thermoplastic wall sheets 12 and 14 when secured about their peripheral edges, form a light tight envelope for the film chip 18 and paper barrier 20 enclosed therein.

The dental intra-oral x-ray film packet 10 of the present invention may also include a visual indicator incorporated in the thermoplastic shielding wall 14, which in the post x-ray chemical processing condition would alert the practitioner if the film packet has been improperly oriented during the x-ray exposure state.

In the embodiment illustrated herein, the dental intra-oral x-ray film packet 10 is defined by an envelope formed by two sheets of thermoplastic material 12 and 14, one of the thermoplastic sheets 14 having a non-lead metal fiber powder incorporated therein. The thermoplastic utilized to form the dental intra-oral x-ray film packet can include but is not limited to a polyolefin, polyester, polyethylene terphthalate (PET), polyvinyl chloride (PVC), polystyrenes, polyethylene, polypropylene, or polyimide.

Figure 3:
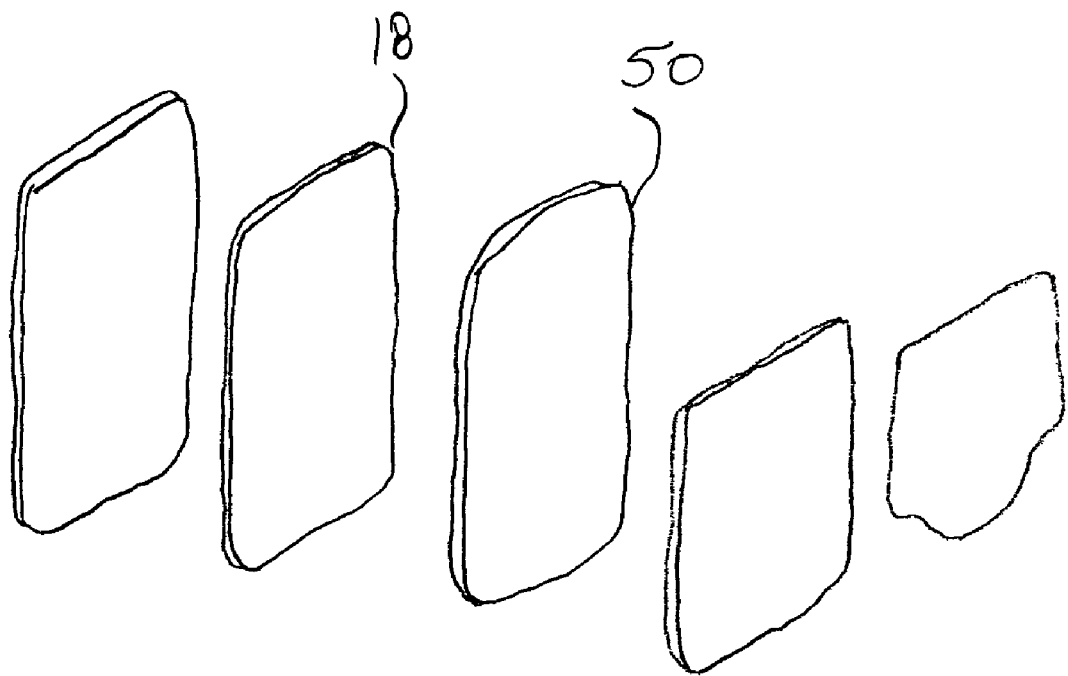
FIG. 3 illustrates an exploded view of a second embodiment of the dental x-ray packet of the present invention.

In a second embodiment of the present invention illustrated in FIG. 3, the non-lead, radio opaque shielding element would be in the form of an insertable chip 50 formed of a thermoplastic sheet or film in which the non-lead metal fiber powder in the form of preferably tungsten or an alloy of stainless steel is disbursed. This thermoplastic sheet or film 50 would be insertable within the film packet with the film chip 18. This embodiment would obviate the need for the non-lead metal fiber powder being incorporated in one of the thermoplastic walls of the film packet 10. This radio opaque sheet or film 50 would have the same radiation absorption and transmissive aspect as having the non-lead radio opaque material disbursed in one of the walls of the film packet. Further, this radio opaque thermoplastic sheet or film could be formed from but not limited to a polyolefin, polyester, polyethylene terphthalate (PET), polyvinyl chloride (PVC), polystyrenes, polyethylene, polypropylene, or polyimide.

The dental intra-oral x-ray film packet 10 of the present invention may also incorporate a positioning indicator in the form of a dot or dimple 22 formed on the film chip 18 (See FIG. 2), yet tactily located using a finger, such dot or dimple 22 aids in orientation for the dental practitioner as it can be used to identify the exposed side, shielded side, and top and bottom of the film chip for diagnostic purposes.

The dental intra-oral x-ray film packet of the present invention allows the dental practitioner the facile use of the dental intra-oral x-ray film packet, the facile removal of the film chip from the envelope after exposure, and further aids the dental practitioner in orienting the dental intra-oral x-ray film packet within the oral cavity and its orientation during chemical processing. The packet still further incorporates a non-hazardous material, thus making the disposable items (thermoplastic envelope and paper barrier) safe for disposal in landfills.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

We claim:

1. An intra-oral x-ray film packet comprising an intra-oral outer envelope having a film chip disposed and encapsulated within said intra-oral outer envelope, said film chip including a positioning indicator in the form of a tactile dot or dimple tactilely locatable for identifying an exposed side of said film chip, a shielded side of said film chip, and a top and bottom of said film chip for diagnostic purposes, said intra-oral outer envelope comprising two thermoplastic wall components and closure flap, said wall components being formed from light opaque material, the film packet incorporating a non-lead radio-opaque composite material having x-ray radiation attenuation effectiveness.

2. The intra-oral x-ray film packet in accordance with claim 1 wherein said non-lead radio-opaque composite material comprises tungsten fiber powder.

3. The intra-oral x-ray film packet in accordance with claim 1 wherein the non-lead radio-opaque composite material comprises a fiber powder of an alloy of stainless steel.

4. The intra-oral x-ray film packet in accordance with claim 1 wherein said non-lead radio-opaque composite material comprises one of said two thermoplastic walls of said film packet.

5. The intra-oral x-ray film packet in accordance with claim 4 wherein said closure flap is comprised of a thermoplastic light opaque material and non-lead radio-opaque composite material.

6. The intra-oral x-ray film packet in accordance with claim 4 wherein said thermoplastic wall having said non-lead radio-opaque composite material incorporated therein includes a visual indicator incorporated in the thermoplastic shielding wall which after post x-ray chemical processing serves as an indicia to the practitioner if said intra-oral x-ray film packet had been improperly oriented during the x-ray exposure.

7. The intra-oral x-ray film packet in accordance with claim 1 wherein said non-lead radio-opaque composite material comprises a thermoplastic sheet or film insertable into said film packet and juxtaposed said film chip.

8. The intra-oral x-ray film packet in accordance with claim 7 wherein said thermoplastic sheet or film insertable into said film packet and juxtaposed said film includes a visual indicator incorporated in the thermoplastic shielding in the thermoplastic sheet or film, which after post x-ray chemical processing serves as an indicia to the practitioner if said intra-oral x-ray film packet has been improperly oriented during x-ray exposure.

* * * * *